(12) United States Patent  
Nethercot et al.

(10) Patent No.: US 8,539,326 B1
(45) Date of Patent: Sep. 17, 2013

(54) METHOD AND IMPLEMENTATION OF CYCLIC REDUNDANCY CHECK FOR WIDE DATABUS

(75) Inventors: Mark R. Nethercot, Peebles (GB); Martin B. Rhodes, Peebles (GB); Gareth D. Edwards, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 118 days.

(21) Appl. No.: 13/314,123

(22) Filed: Dec. 7, 2011

(51) Int. Cl.
*G06F 11/10* (2006.01)

(52) U.S. Cl.
USPC ........... 714/807; 714/785; 714/808; 714/758; 707/699

(58) Field of Classification Search
None
See application file for complete search history.

(56) References Cited

U.S. PATENT DOCUMENTS

| | | | | |
|---|---|---|---|---|
| 6,609,225 B1* | 8/2003 | Ng | ................................ | 714/781 |
| 6,629,288 B1* | 9/2003 | Bernath et al. | ................ | 714/807 |
| 7,590,916 B2* | 9/2009 | Katashita et al. | ............. | 714/757 |
| 8,443,256 B2* | 5/2013 | Shafai et al. | .................. | 714/758 |
| 2004/0049726 A1* | 3/2004 | Goyins et al. | ................. | 714/758 |
| 2010/0070839 A1* | 3/2010 | Shigihara et al. | ............ | 714/807 |
| 2010/0211859 A1* | 8/2010 | Garcia et al. | .................. | 714/807 |
| 2010/0241936 A1* | 9/2010 | Hirth | ............................ | 714/807 |

* cited by examiner

*Primary Examiner* — John Trimmings
(74) *Attorney, Agent, or Firm* — Gerald Chan

(57) ABSTRACT

A method for computing a X-bit cyclical redundancy check (CRC-X) frame value for a data frame transmitted over a N-bit databus is provided. The method includes receiving a N-bit data input with an end-of-frame for the data frame at bit position M on the N-bit databus, performing a bitwise XOR on X most significant bits of the N-bit data input with a CRC-X feedback value to form a first N-bit intermediate data. The method also includes shifting the first N-bit intermediate data by M bit positions to align the end-of-frame of the data frame with a least significant bit (LSB), and padding M number of zero bits to a most significant bit (MSB) of the first N-bit intermediate data to form a second N-bit intermediate data.

20 Claims, 5 Drawing Sheets

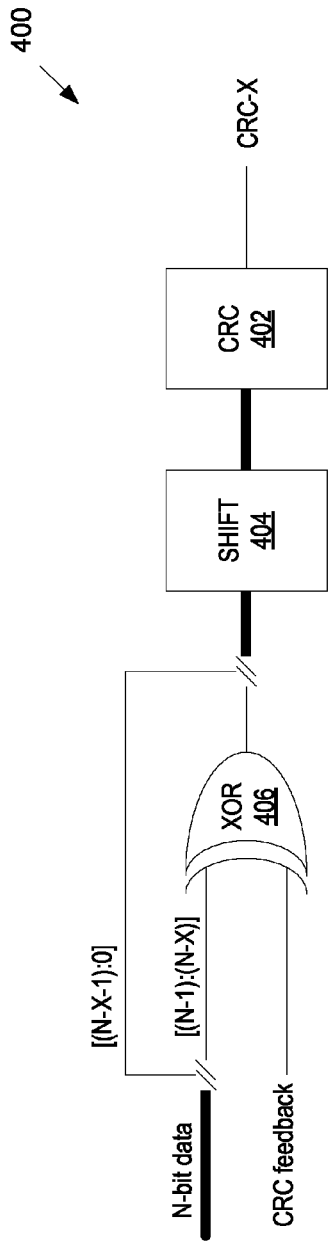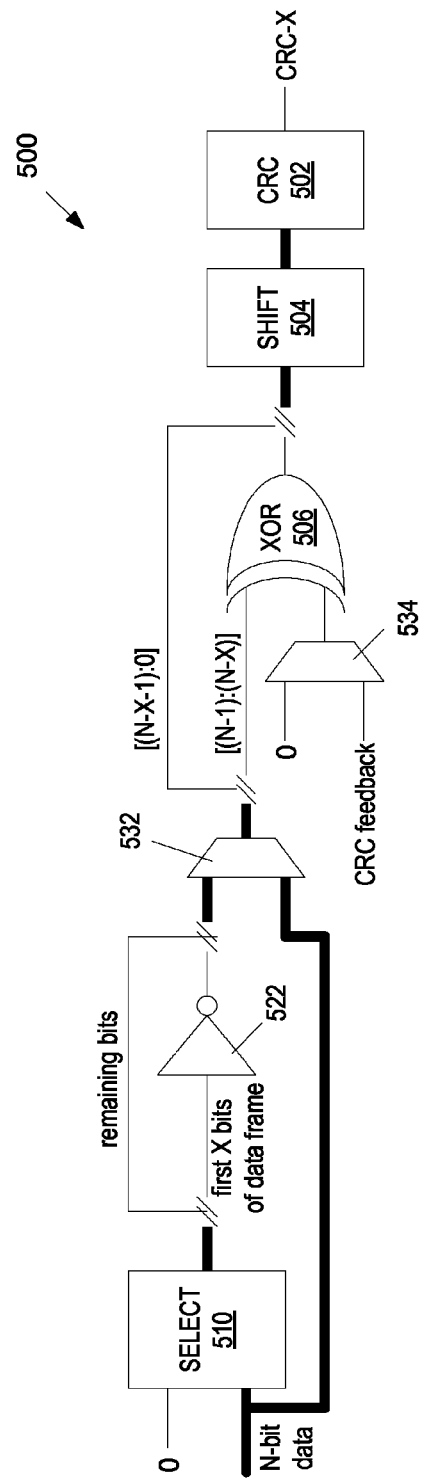
FIG. 4
FIG. 5

METHOD AND IMPLEMENTATION OF CYCLIC REDUNDANCY CHECK FOR WIDE DATABUS

TECHNICAL FIELD

An embodiment described herein relates to integrated circuit devices (ICs), and in particular, to a method of and circuit for calculating a cyclic redundancy check (CRC) value.

BACKGROUND

Data processing systems use various techniques to perform error checking on data transmitted over a network. One common technique is a cyclic redundancy check (CRC). When a block of data, such as a frame or a packet, is transmitted over a network, a CRC is calculated over the block of data and inserted into the data transmission, typically at the end of the block of data. At the receiving end, a CRC is calculated over the received block of data. If there are no errors in the data transmission, the CRC calculated at the receiving end should match the CRC that was inserted into the data transmission.

In a CRC calculation, a designated polynomial represents a divisor that is used to divide a block of data in a long polynomial division. The quotient of the division is discarded, and the remainder of the division is the CRC value. In general, a CRC can have any number of bits as indicated by the particular polynomial used in the CRC algorithm. A CRC-X value has X number of bits and employs a polynomial of the $X^{th}$ order. For example, one commonly used CRC algorithm is a CRC-32. A CRC-32 value has 32-bits, and an example of a polynomial used in a CRC-32 algorithm is:

$$x^{32}+x^{26}+x^{23}+x^{22}+x^{16}+x^{12}+x^{11}+x^{10}+x^8+x^7+x^5+x^4+x^2+x+1$$

One particular communications protocol that uses this polynomial for its CRC-32 calcualtion is the Ethernet protocol, where a CRC-32 value is calculated over the header and data fields of an Ethernet frame and appended to the end of the Ethernet frame. Other protocols may use other polynomials and may also use other common CRC algorithms including CRC-8, CRC-16, and CRC-24.

SUMMARY

In accordance with some embodiments, a method for computing a X-bit cyclical redundancy check (CRC-X) frame value for a data frame transmitted over a N-bit databus is provided. The method includes receiving a N-bit data input with an end-of-frame for the data frame at bit position M on the N-bit databus, performing a bitwise XOR on X most significant bits of the N-bit data input with a CRC-X feedback value to form a first N-bit intermediate data. The method also includes shifting the first N-bit intermediate data by M bit positions to align the end-of-frame of the data frame with a least significant bit (LSB), and padding M number of zero bits to a most significant bit (MSB) of the first N-bit intermediate data to form a second N-bit intermediate data. The method further includes performing a CRC-X calculation on all bits of the second N-bit intermediate data to compute the X-bit CRC-X frame value for the data frame.

In one or more embodiments, the N-bit data input may include a start-of-frame for the data frame, and the CRC-X feedback value for the data frame may be all zeros. Also, the method may further include replacing all bits that are at a more significant bit position than the start-of-frame in the N-bit data input with a corresponding zero bit prior to performing the bitwise XOR.

In one or more embodiments, the CRC-X calculation may have an initial value of all ones, and the method may further include inverting a first X number of most significant bits of the data frame prior to performing the bitwise XOR.

In one or more embodiments, the CRC-X frame value for the data frame may be computed in one clock cycle corresponding to a transmission line rate on the N-bit databus.

In one or more embodiments, the N-bit data input may include, at a lesser significant bit position than bit position M, a start-of-frame for another data frame without an end-of-frame for the other data frame. Also, the method may further include replacing all bits that are at a more significant bit position than the start-of-frame for the other data frame in the N-bit data input with a corresponding zero bit to form a third N-bit intermediate data, and performing another CRC-X calculation on all bits of the third N-bit intermediate data to compute a CRC-X feedback value for the other data frame.

In one or more embodiments, the method may further include inverting a first X number of most significant bits of the other data frame prior to performing the CRC-X calculation on all bits of the third N-bit intermediate data.

In one or more embodiments, the CRC-X feedback value for the other data frame may be computed in one clock cycle corresponding to a transmission line rate on the N-bit databus.

In one or more embodiments, X may be 8, 16, 32, or 64.

In one or more embodiments, X may be 32, and the data frame may be an Ethernet frame.

In accordance with other embodiments, a frame CRC calculation engine circuitry for computing a X-bit cyclical redundancy check (CRC-X) frame value for a data frame to be transmitted over a N-bit databus is provided. The frame CRC calculation engine circuitry includes a XOR gate configured to perform a XOR operation on X most significant bits of a N-bit data input with a CRC-X feedback value to form a first N-bit intermediate data. The frame CRC calculation engine circuitry may also include a shift logic circuitry coupled to the XOR gate, the shift logic circuitry configured to shift the first N-bit intermediate data by M bit positions to align the end-of-frame of the data frame with a least significant bit (LSB), and to pad M number of zero bits to a most significant bit (MSB) of the first N-bit intermediate data to form a second N-bit intermediate data, wherein bit position M on the N-bit databus indicates an end-of-frame of the data frame. The frame CRC calculation engine circuitry may also include a CRC-X calculation circuitry coupled to the shift logic circuitry, the CRC-X calculation circuitry configured to calculate a CRC-X value on all bits of the second N-bit intermediate data to compute the CRC-X frame value.

In one or more embodiments, the frame CRC calculation engine circuitry may further include an input selector configured to replace all bits that are at a more significant bit position than a start-of-frame of the data frame in the N-bit data input with a corresponding zero bit.

In one or more embodiments, the frame CRC calculation engine circuitry may further include an inverter configured to invert a first X number of most significant bits of the data frame in the N-bit data input if the CRC-X calculation has an initial value of all ones.

In one or more embodiments, X may be 8, 16, 32, or 64.

In one or more embodiments, X may be 32, and the data frame may be an Ethernet frame.

In accordance with other embodiments, a wide-databus frame CRC calculation engine circuitry for computing X-bit cyclical redundancy check (CRC-X) frame values for one or more data frames to be transmitted over a N-bit databus is provided. The wide-databus frame CRC calculation engine circuitry includes at least one frame CRC calculation engine.

Each frame CRC calculation engine includes a XOR gate configured to perform a XOR operation on X most significant bits of a N-bit data input with a CRC-X feedback value of a first data frame to form a first N-bit intermediate data. Each frame CRC calculation engine also includes a shift logic circuitry coupled to the XOR gate, the shift logic circuitry configured to shift the first N-bit intermediate data by M bit positions to align the end-of-frame of the first data frame with a least significant bit (LSB), and to pad M number of zero bits to a most significant bit (MSB) of the first N-bit intermediate data to form a second N-bit intermediate data, wherein bit position M on the N-bit databus indicates an end-of-frame of the first data frame. Each frame CRC calculation engine further includes a first CRC-X calculation circuitry coupled to the shift logic circuitry, the first CRC-X calculation circuitry configured to calculate a first CRC-X value on all bits of the second N-bit intermediate data to compute the CRC-X frame value for the first data frame. The wide-databus frame CRC calculation engine circuitry may further include a feedback CRC-X calculation engine, comprising a first input selector to replace all bits that are at a more significant bit position than a start-of-frame for a second data frame on the N-bit data input with zero bits to form a third N-bit intermediate data. The feedback CRC-X calculation engine may further include a second CRC-X calculation circuitry coupled to the input selector, the second CRC-X calculation circuitry configured to calculate a second CRC-X value on all bits of the third N-bit intermediate data to compute a feedback CRC-X frame value for the second data frame.

In one or more embodiments, the frame CRC calculation engine circuitry may further include a second input selector configured to replace all bits that are at a more significant bit position than a start-of-frame of the first data frame in the N-bit data input with a corresponding zero bit.

In one or more embodiments, the frame CRC calculation engine circuitry may further include a first inverter configured to invert a first X number of most significant bits of the first data frame in the N-bit data input if the CRC-X calculation has an initial value of all ones.

In one or more embodiments, the feedback CRC calculation engine circuitry may further include a second inverter configured to invert a first X number of most significant bits of the second data frame in the third N-bit intermediate data if the CRC-X calculation has an initial value of all ones.

In one or more embodiments, X may be 8, 16, 32, or 64.

In one or more embodiments, a data frame minimum length may be L bits, and the wide-databus frame CRC calculation engine circuitry may have K number of frame CRC calculation engines, wherein K is a quotient of N/L if a remainder of N/L is 0, and K is one plus the quotient of N/L if the remainder of N/L is greater than 0.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 4 illustrates a frame CRC-X calculation engine circuitry for computing a X-bit CRC-X frame value according to some embodiments.

FIG. 5 illustrates a frame CRC-X calculation engine circuitry for computing a X-bit CRC-X frame value according to some other embodiments.

DETAILED DESCRIPTION

Figure 1:
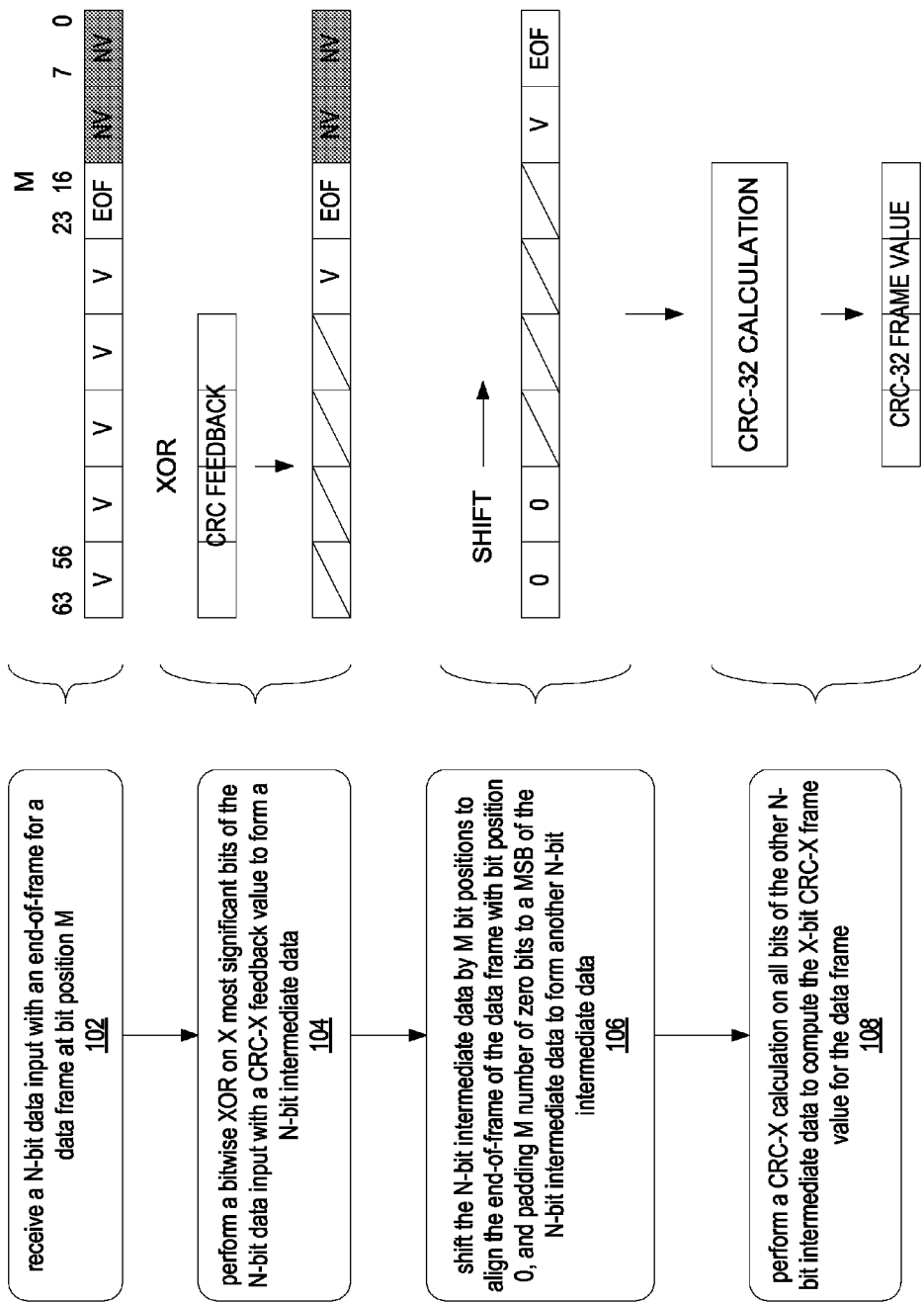
FIG. 1 illustrates a method for computing a X-bit cyclical redundancy check (CRC-X) frame value according to some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Integrated circuit devices in a data processing system typically employ databus widths having more than a single bit. They typically have wider databus widths of N-bits, where N is usually a multiple of 8 such that the databus is byte-aligned. In a N-bit databus of a big-endian system, bit position N−1 of the N-bit databus is a most significant bit (MSB), bit position 0 of the N-bit databus is a least significant bit (LSB), and the MSB precedes the LSB on the N-bit databus. In a N-bit databus of a little-endian system, bit position 0 of the N-bit databus is a most significant bit (MSB), bit position N−1 of the N-bit databus is a least significant bit (LSB). References to embodiments will refer to a N-bit databus of a big-endian system. However, it should be understood that one or more other embodiments can also be practiced in a little-endian system.

As Ethernet moves towards higher line rates, in order to accommodate these higher line rates while maintaining a reasonable clock rate, the databus width of the system is increased. For example, at a line rate of 1 gigabits per second (Gbps) at a system clock frequency of 125 MHz, a databus width of 8-bits is required. At a line rate of 10 Gbps at a system clock frequency of 156 MHz, a databus width of 64-bits is required. Similarly, at a line rate of 40 Gbps at a system clock frequency of 156 MHz, a databus width of 256-bits is required, and at a line rate of 100 Gbps at a system clock frequency of 195 MHz, a databus width of 512-bits is required.

In a CRC calculation, the block of data for which the CRC is being calculated over is treated mathematically as a serial bit stream. However, as noted above, integrated circuit devices in a data processing system typically employ databus widths having more than a single bit. Furthermore, the block of data, for example, the data fields of an Ethernet frame, can have a variable length and can take on any number of bits. Hence, when a data frame is transmitted over a databus having N-bits, the start-of-frame and the end-of-frame for the data frame can take on any number of bit positions on the databus. As the databus widths are becoming wider, the number of possible start-of-frame and end-of-frame bit positions on the N-bit databus becomes increasing large. In addition, the transmission of a frame may take more than one clock cycle if the frame is longer than the databus width (i.e., the frame is longer than N bits).

In order to calculate a CRC value over a frame that is transmitted over multiple clock cycles, the entire data frame can be stored in memory, and a CRC can be calculated over the entire frame once the entire frame has been received and stored in memory. While this technique may be effective for small data frame sizes, when the data frame size becomes large, implementation of the large amount of memory required to store the entire frame may become impractical. Another technique to calculate a CRC value over a frame transmitted over multiple clock cycles is to calculate a CRC feedback value over the data transmitted at each clock cycle. The CRC feedback value is used as an initial CRC value in the CRC calculation of the data transmitted in the next clock cycle. In this manner, the entire data frame need not be stored in memory, and a running CRC result is maintained until the end of the data frame. This technique however, assumes that the data frame will end at a bit position that is aligned with the databus. In other words, this technique assumes that the end-of-frame occurs at the least significant bit of the databus or at the bit 0 position. With small databus widths, the problem of the possibility of the end-of-frame occurring at any bit position of the databus can be solved by forcing the trailing bits that are after the end-of-frame on the databus to all zeros and then applying a reverse CRC calculation to unroll the result of forcing the zero bits to determine the CRC value of the data frame. However, with larger databus widths, this technique requires much greater amount of logic resources to implement because of the large number of possible end-of-frame positions.

FIG. 1 illustrates a flow diagram of a method for computing a X-bit cyclical redundancy check (CRC-X) frame value for a data frame transmitted over a N-bit databus according to some embodiments. To further illustrate how the method is performed, and by way of example, the results of each step of a CRC-32 calculation being performed on a 64-bit data input that is transmitted over a 64-bit databus is shown next to each step of the flow diagram. The method shown in FIG. 1 is used to calculate a CRC-X frame value for a data frame with a end-of-frame being transmitted on the current data cycle. In step 102, a N-bit data input with an end-of-frame for a data frame at bit position M is received at a data processing unit such as an integrated circuit device or an internal block of an integrated circuit device. One or more elements of the flow diagram can be performed by the data processing unit. In step 104, a bitwise XOR is performed on the X most significant bits of the N-bit data input with a CRC-X feedback value to form an N-bit intermediate data. The CRC-X feedback value is the running CRC-X value that is computed for all the data that belongs to this data frame transmitted in previous data cycles. In step 106, the N-bit intermediate data is shifted by M bit positions to align the end-of-frame of the data frame with the LSB or bit position 0, and M number of zero bits is padded to the MSB of the first N-bit intermediate data to form another N-bit intermediate data. In step, 108, a CRC-X calculation is performed on all bits of this latter N-bit intermediate data to compute the X-bit CRC-X frame value for the data frame.

By way of example, the results of each step of a CRC-32 calculation being performed on a 64-bit data input according to the method of FIG. 1 will now be described. In this example, and as shown in FIG. 1, a 64-bit data input is received at step 102. Each block represents a byte of data or 8 bits of data. A "V" indicates that the byte is valid data for the data frame. A "EOF" indicates that the byte is the last data byte of the data frame. A "NV" indicates that the byte is not valid data for the data frame. In this particular data cycle, an end-of-frame of the data frame occurs at bit position 16 of the 64-bit data input as indicated by the "M." Having received the 64-bit data input with an end-of-frame for the data frame, the method performs a bitwise XOR to the 32 most significant bits of the 64-bit data input with a CRC feedback value from the previous data cycle at step 104 to form the first intermediate data. The XOR operation is performed on the 32 most significant bits because the CRC algorithm employed in this example is a CRC-32. The result of the XOR operation is indicated by the bytes with a diagonal line.

Having applied the XOR operation, the method continues by shifting the first intermediate data by 16 bits to align the end-of-frame of the data frame to bit position 0, and by padding the first intermediate data with 16 zero bits to form the second intermediate data at step 106. The first intermediate data is shifted by 16 bits and padded with 16 zero bits because the end-of-frame for this particular frame occurs at bit position 16. The second intermediate data is then used as the input to a CRC-32 calculation circuitry that calculates a CRC-32 value over all bits of the 64-bit second intermediate data. This CRC-32 value corresponds to the CRC-32 frame value of the entire data frame.

It should be noted that the method of FIG. 1 assumes that there are at least X number of valid bits in the N-bit data input for the data frame received in the current data cycle. For example, in a CRC-32 calculation, it is assumed that the N-bit data input will have at least 32 bits of valid data including the end-of-frame. Nevertheless, to handle data input with less than X number of valid bits, a separate CRC-X calculation that calculates the CRC-X value of the first X bits of the data input can be maintained and selected accordingly when a data frame has less than X number of valid bits including the end-of-frame on the particular data cycle. Because the number of X bits is expected to be small compared to the databus width N, this extra CRC-X calculation computed on a few number of bits can be implemented with minimal additional logic.

Figure 2:
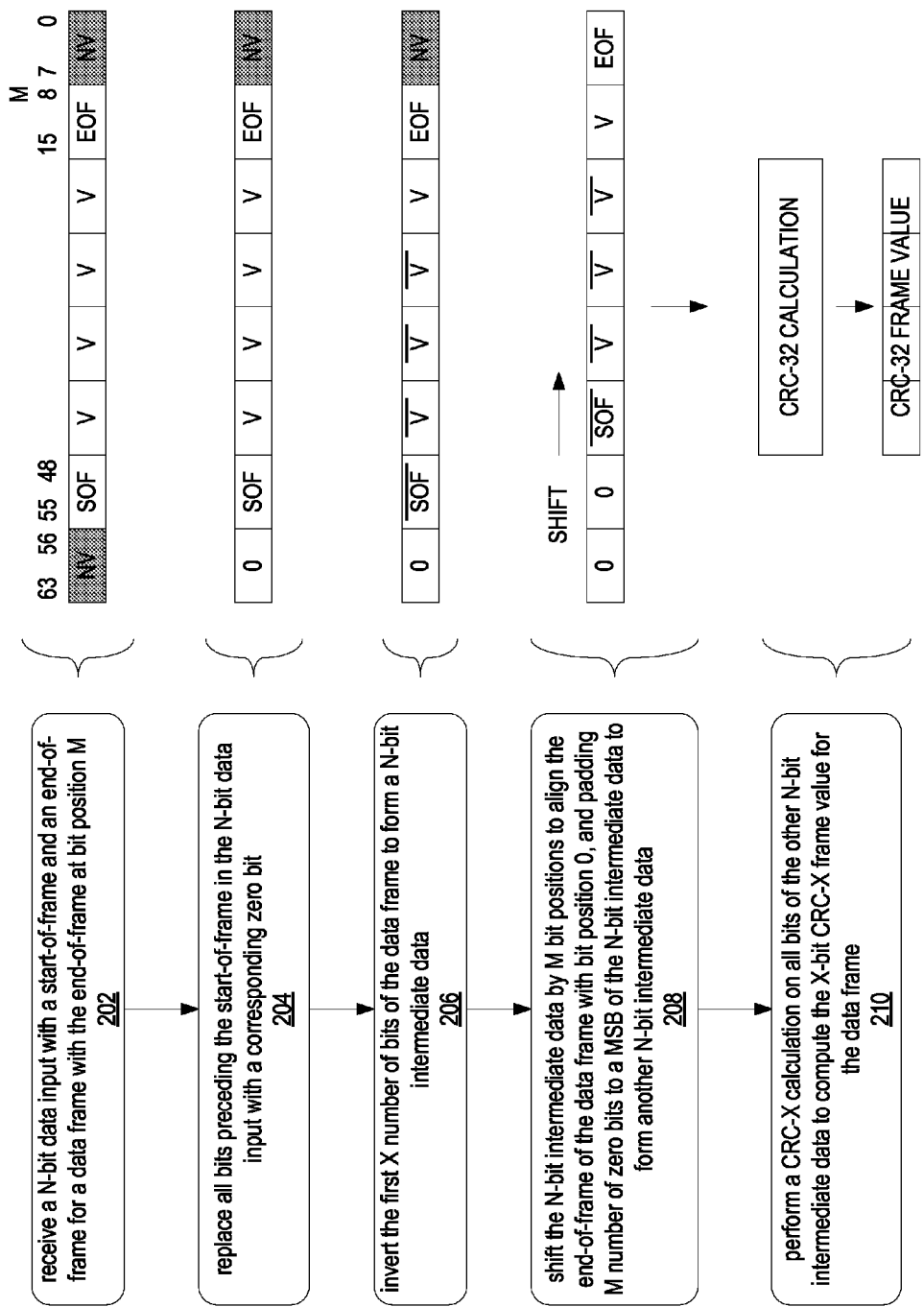
FIG. 2 illustrates a method for computing a X-bit CRC-X frame value according to some other embodiments.

FIG. 2 illustrates a flow diagram of a method for computing a X-bit cyclical redundancy check (CRC-X) frame value for a data frame transmitted over a N-bit databus according to some embodiments. The method shown in FIG. 2 is used to calculate a CRC-X frame value for a data frame with both a start-of-frame and an end-of-frame being transmitted on the current data cycle. In step 202, a N-bit data input with a start-of-frame for the data frame and an end-of-frame at bit position M for the same data frame is received. In step 204, all bits preceding the start-of-frame of the data frame in the N-bit data input is replaced with a corresponding zero bit. In step 206, the first X number of bits of the data frame is inverted to form a N-bit intermediate data. The inversion step 206 is needed only if the initialization value of the particular CRC-X algorithm is all ones. Otherwise, if the initialization value of the particular CRC-X algorithm is zero, step 206 can be omitted. In step 208, the N-bit intermediate data is shifted by M bit positions to align the end-of-frame of the data frame with the LSB or bit position 0, and M number of zero bits is padded to the MSB of the N-bit intermediate data to form another N-bit intermediate data. In step, 210, a CRC-X calculation is performed on all bits of this latter N-bit intermediate data to compute the X-bit CRC-X frame value for the data frame.

When an entire data frame that includes a start-of-frame and an end-of-frame is received on the same data cycle, it is not necessary to perform a XOR operation with a CRC feedback value because there is no CRC feedback value maintained for this frame in the previous data cycles. However, in order to reuse the same logic as the logic that is used to perform the method in FIG. 1, in an alternative embodiment, a bitwise XOR with X number of zero bits can be performed on the X most significant bits of the N-bit intermediate data after the inversion step 206. A bitwise XOR with zero results in the identity function, and hence the CRC-X calculation is not affected by this extra operation.

By way of example, the results of each step of a CRC-32 calculation being performed on a 64-bit data input according to the method of FIG. 2 will now be described. In this example, and as shown in FIG. 2, a 64-bit data input is received at step 202. A "SOF" indicates that the byte is the starting byte of the data frame. In this particular data cycle, a start-of-frame for the data frame occurs at bit position 55, and an end-of-frame of the data frame occurs at bit position 8 of the 64-bit data input as indicated by the "M." Having received the 64-bit data input with both a start-of-frame and an end-of-frame for the data frame, the method replaces all bits preceding the start-of-frame with a corresponding zero bit at step 204. In this case, bits 63 to 56 of the 64-bit data input are replaced with zero bits because the start-of-frame occurs at bit position 55.

Next, the method continues by inverting the first 32 bits of the data frame to form an intermediate data at step 206. The first 32 bits of the data frame is inverted because a CRC-32 calculation is being performed. In this particular example, the first 32 bits of the data frame are bits 55 to 24 of the 64-bit data input. The inverted results are shown with the bar above the byte indications. It should be noted that this inversion of the first 32 bits of the data frame is needed only if the initialization value of the particular CRC-X algorithm is all ones. Otherwise, if the initialization value of the particular CRC-X algorithm is zero, the first 32 bits of the data frame should not be inverted. The intermediate data is then shifted by 8 bits to align the end-of-frame of the data frame to bit position 0, and padded with 8 zero bits to form another intermediate data at step 208. The original intermediate data is shifted by 8 bits and padded with 8 zero bits because the end-of-frame for this particular frame occurs at bit position 8. The latter intermediate data is then used as the input to a CRC-32 calculation circuitry that calculates a CRC-32 value over all bits of the latter 64-bit intermediate data. This CRC-32 value corresponds to the CRC-32 frame value of the entire data frame.

Figure 3:
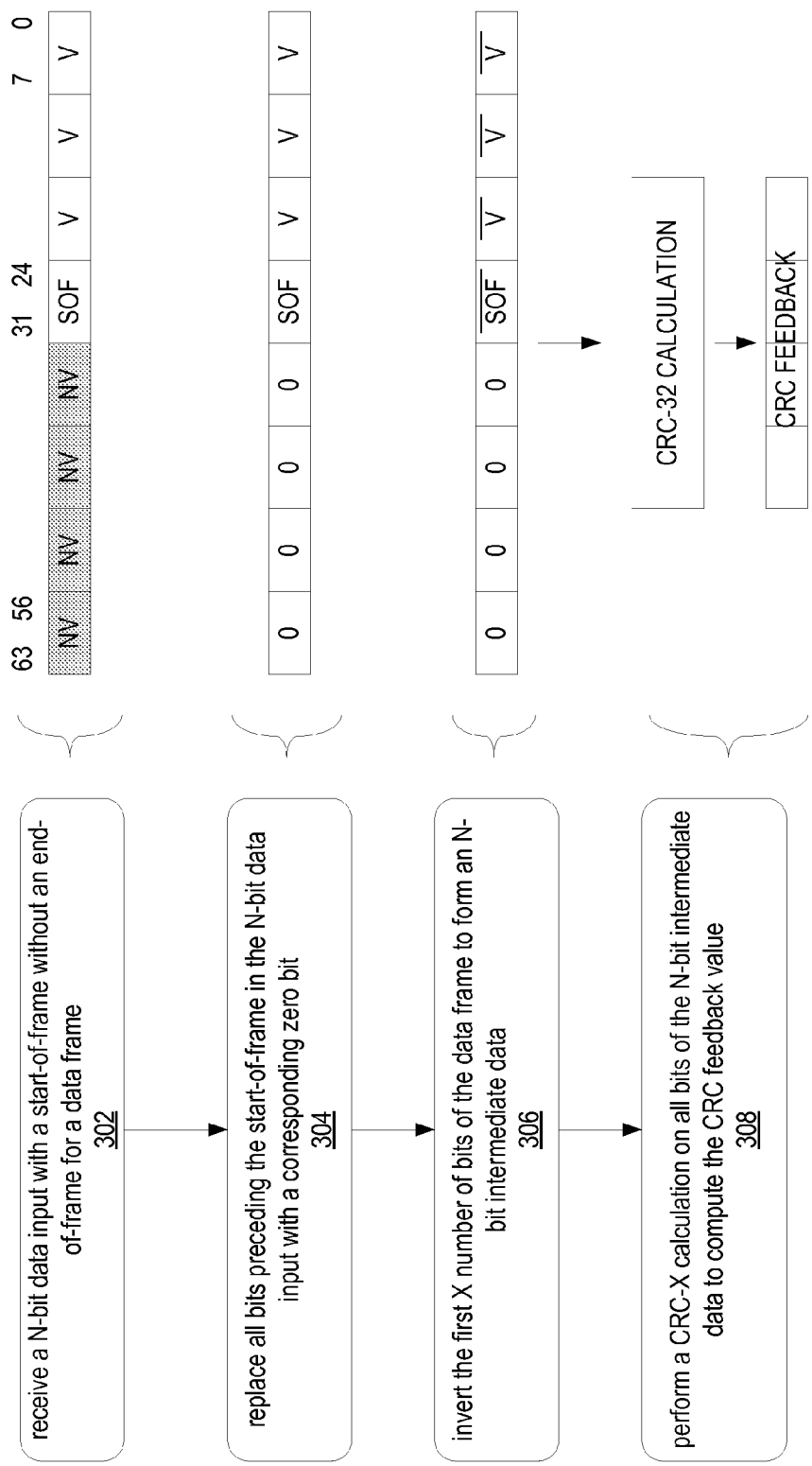
FIG. 3 illustrates a method for computing a X-bit CRC-X feedback value according to some embodiments.

FIG. 3 illustrates a flow diagram of a method for computing a X-bit cyclical redundancy check (CRC-X) feedback value for a data frame being transmitted over a N-bit databus according to some embodiments. The method shown in FIG. 3 is used to calculate a CRC-X feedback value for a data frame with a start-of-frame but no end-of-frame being transmitted on the current data cycle. The CRC-X feedback value is used in subsequent data cycles to compute the CRC-X frame value of the entire data frame. In step 302, a N-bit data input with a start-of-frame without an end-of-frame for the data frame is received. In step 304, all bits preceding the start-of-frame of the data frame in the N-bit data input is replaced with a corresponding zero bit. In step 306, the first X number of bits of the data frame is inverted to form a N-bit intermediate data. The inversion step 306 is needed only if the initialization value of the particular CRC-X algorithm is all ones. Otherwise, if the initialization value of the particular CRC-X algorithm is zero, step 306 can be omitted. In step 308, a CRC-X calculation is performed on all bits of the N-bit intermediate data to compute the X-bit CRC-X feedback value for the data frame to be used in subsequent data cycles corresponding to the current data frame.

It should be noted that the method of FIG. 3 assumes that there are at least X number of valid bits in the N-bit data input for the data frame received in the current data cycle. For example, in a CRC-32 calculation, it is assumed that the N-bit data input will have at least 32 bits of valid data including the start-of-frame. For data input with less than X number of valid bits, data bits that are transmitted in the subsequent data cycle should be inverted such that the first X bits of the data frame are inverted in order to maintain the correct CRC-X calculation, if the initialization value of the particular CRC-X algorithm is all ones.

By way of example, the results of each step of a CRC-32 calculation being performed on a 64-bit data input according to the method of FIG. 3 will now be described. In this example, and as shown in FIG. 3, a 64-bit data input is received at step 302. In this particular data cycle, a start-of-frame for the data frame occurs at bit position 31 with no end-of-frame occurring in this data cycle. Having received the 64-bit data input with a start-of-frame but no end-of-frame for the data frame, the method replaces all bits preceding the start-of-frame with a corresponding zero bit at step 304. In this case, bits 63 to 32 of the 64-bit data input are replaced with zero bits because the start-of-frame occurs at bit position 31.

Next, the method continues by inverting the first 32 bits of the data frame to form an intermediate data at step 306. The first 32 bits of the data frame is inverted because a CRC-32 calculation is being performed. In this particular example, the first 32 bits of the data frame are bits 31 to 0 of the 64-bit data input. The inverted results are shown with the bar above the byte indications. It should be noted that this inversion of the first 32 bits of the data frame is needed only if the initialization value of the particular CRC-X algorithm is all ones. Otherwise, if the initialization value of the particular CRC-X algorithm is zero, the first 32 bits of the data frame should not be inverted. The intermediate data is then used as the input to a CRC-32 calculation circuitry that calculates a CRC-32 value over all bits of the 64-bit intermediate data. This CRC-32 value corresponds to the CRC-32 feedback value that is to be used in subsequent data cycles to compute the CRC-32 frame value over the entire frame.

While the above methods and examples have been described using a CRC-32 embodiment, the methods described above can be applied to embodiments for calculating a CRC-8, CRC-16, CRC-32, CRC-64, or any other particular CRC algorithm. In some embodiments, the CRC-X frame value for the data frame is computed in one clock cycle corresponding to a transmission line rate on the N-bit databus. For example, for a line rate of 100 Gbps to be transmitted on a databus width of 512-bits, a clock frequency of 195 MHz is required. Thus, in embodiments that employ this line rate and bus width, the CRC-X calculation is performed within 5.13 nanoseconds corresponding to one clock cycle of a 195 MHz clock. In other embodiments, the CRC-X frame value for the data frame can computed in more than one clock cycle, if the latency of the system allows for additional clock cycles. In further embodiments, the CRC-X feedback value is also computed in one clock cycle corresponding to a transmission line rate on the N-bit databus. By being able to compute the CRC-X feedback value in one clock cycle, this eliminates the need to buffer the data input of subsequent data cycles because the CRC-X feedback value is readily available when the next data cycle occurs. In other embodiments where the CRC-X feedback value is compute over more than one clock cycle, the input data can be buffered for the same amount of clock cycles it takes for the CRC-X feedback value to be calculated.

Having described embodiments of a method of CRC-X calculation, exemplary implementations of circuitry that are used in integrated circuit devices for performing the CRC-X calculation according to some embodiments will now be described. FIG. 4 illustrates an exemplary implementation of some embodiments of a frame CRC-X calculation engine circuitry 400 for computing a X-bit cyclical redundancy check (CRC-X) frame value for a data frame to be transmitted over a N-bit databus. The frame CRC-X calculation engine circuitry 400 is used to calculate a CRC-X frame value for a data frame with a end-of-frame being transmitted on the current data cycle. In one embodiment, the frame CRC-X calculation engine circuitry 400 includes a XOR gate 406, a shift logic circuitry 404, and a CRC-X calculation circuitry 402. The X-bit XOR gate 406 is configured to perform a XOR operation on X most significant bits of a N-bit data input with a CRC-X feedback value to form a N-bit intermediate data. The XOR operation is only performed on the X most significant bits of the N-bit data input and hence the other bits can bypass the XOR gate 406. The shift logic circuitry 404 is coupled to the XOR gate 406, and is configured to shift the N-bit intermediate data by M bit positions to align the end-of-frame of the data frame with the LSB, and to pad M number of zero bits to a MSB of the N-bit intermediate data to form a second N-bit intermediate data, where bit position M on the N-bit databus indicates an end-of-frame of the data frame. The CRC-X calculation circuitry 402 is coupled to the shift logic circuitry 404, and is configured to calculate a CRC-X value on all bits of the second N-bit intermediate data to compute the CRC-X frame value. Specific implementations of the CRC-X calculation circuitry 402 depends on the particular polynomial that corresponds to the particular CRC-X calculation. Implementations of a CRC-X calculation circuitry to compute a CRC-X value over all bits of a data input are known in the art and hence will not be described here.

FIG. 5 illustrates another exemplary implementation of some embodiments of a frame CRC-X calculation engine circuitry 500 for computing a X-bit cyclical redundancy check (CRC-X) frame value for a data frame to be transmitted over a N-bit databus. The frame CRC-X calculation engine circuitry 500 is used to calculate a CRC-X frame value for a data frame with an end-of-frame being transmitted on the current data cycle, or for a data frame with both a start-of-frame and an end-of-frame transmitted on the current data cycle. In one embodiment, the frame CRC-X calculation engine circuitry 500 includes a XOR gate 506, a shift logic circuitry 504, and a CRC-X calculation circuitry 502. The frame CRC-X calculation engine circuitry 500 further includes an input selector 510, an inverter 522, and multiplexers 532 and 534.

The input selector 510 is configured to replace all bits preceding a start-of-frame of the data frame in the N-bit data input with a corresponding zero bit. The inverter 522 is configured to invert the first X number of bits of the data frame in the N-bit data input if the particular CRC-X calculation according to its algorithm has an initialization value of all ones. Thus, in other embodiments where the initialization value of the CRC-X calculation is zero, the inverter 522 can be omitted. Because the inverter is configured to invert only the first X number of bits of the data frame, the remaining bits of the data frame and other bits on the N-bit data input can bypass the inverter 522. Multiplexer 532 is configured to select between the partially inverted N-bit data input or the un-inverted N-bit data input. The inversion is only needed if the N-bit data input includes both a start-of-frame and an end-of-frame for the data frame. Thus, multiplexer 532 selects the partially inverted N-bit data input if a start-of-frame for the data frame is detected. Otherwise, if only an end-of-frame is detected without a corresponding start-of-frame, multiplexer 532 selects the un-inverted N-bit data input.

The output of the multiplexer 532 is then fed into the XOR gate 506. The XOR gate 506 is configured to perform a XOR operation on X most significant bits of the N-bit data input selected from the multiplexer 532 with a CRC-X feedback value if an end-of-frame is detected without a corresponding start-of-frame on the N-bit data input to form a N-bit intermediate data. If a start-of-frame is detected for the data frame, the N-bit data input selected from the multiplexer 532 can still be fed into the XOR gate 506, but the XOR operation is performed with zeros instead of a CRC-X feedback value in order to maintain N-bit data input selected from the multiplexer 532 unchanged. Multiplexer 534 can be used to select between performing the XOR operation on the N-bit data input selected from the multiplexer 532 with zeros or with a CRC-X feedback value depending on whether a start-of-frame for the data frame is detected.

The XOR operation is only performed on the X most significant bits of the N-bit data input selected from the multiplexer 532 and hence the other bits can bypass the X-bit XOR gate 506. The shift logic circuitry 504 is coupled to the X-bit XOR gate 506, and is configured to shift the N-bit intermediate data by M bit positions to align the end-of-frame of the data frame with the LSB, and to pad M number of zero bits to a MSB of the N-bit intermediate data to form a second N-bit intermediate data, where bit position M on the N-bit databus indicates an end-of-frame of the data frame. The CRC-X calculation circuitry 502 is coupled to the shift logic circuitry 504, and is configured to calculate a CRC-X value on all bits of the second N-bit intermediate data to compute the CRC-X frame value. As described above, a frame CRC-X calculation engine circuitry 500 is able to compute a CRC-X frame value for both frames that have only an end-of-frame in the current data cycle and entire frames with both a start-of-frame and a corresponding end-of-frame in the current data cycle.

Figure 6:
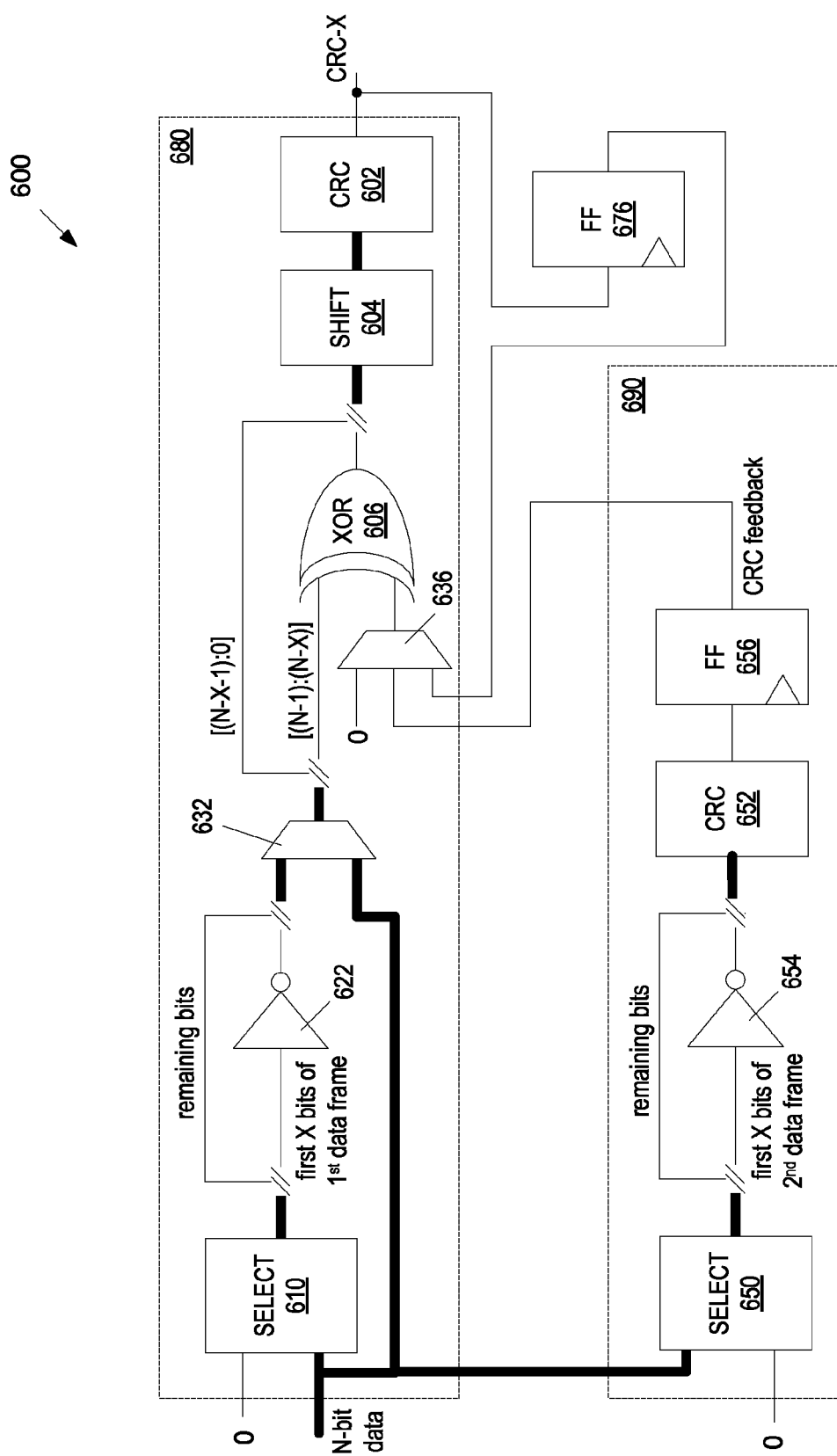
FIG. 6 illustrates a wide-databus frame CRC-X calculation engine circuitry for computing X-bit CRC-X frame values according to some embodiments.

FIG. 6 illustrates an exemplary implementation of some embodiments of a wide-databus frame CRC-X calculation engine circuitry 600 for computing X-bit cyclical redundancy check (CRC-X) frame values for one or more data frames to be transmitted over a N-bit databus. The wide-databus frame CRC-X calculation engine circuitry 600 is used to calculate a CRC-X frame value for each data frame with an end-of-frame, including frames that have both an end-of-frame and a corresponding start-of-frame for that data frame, being transmitted on the current data cycle. The wide-databus frame CRC-X calculation engine circuitry 600 is also used to calculate a CRC-X feedback value for a data frame with only a start-of-frame being transmitted on the current data cycle. The CRC-X feedback value is used to compute the CRC-X frame value for that data frame in subsequent data cycles.

In one embodiment, the wide-databus frame CRC-X calculation engine circuitry 600 includes at least one frame CRC-X calculation engine 680 and a feedback CRC-X calculation engine 690. In an exemplary embodiment, the feedback CRC-X calculation engine 690 includes an input selector 650, an inverter 654, a CRC-X calculation circuitry 652 and a flip-flop 656. The input selector 650 is configured to replace all bits preceding a start-of-frame for a frame that has a start-of-frame but no corresponding end-of-frame on the N-bit data input with zero bits to form a N-bit intermediate data. The inverter 654 is configured to invert the first X number of bits of that data frame in the N-bit intermediate data if the CRC-X calculation has an initial value of all ones. In other embodiments where the initialization value of the CRC-X calculation is zero, the inverter 654 can be omitted. Because the inverter 654 is configured to invert only the first X number of bits of the data frame, the remaining bits of the data frame and other bits on the N-bit data input can bypass the inverter 654. The CRC-X calculation circuitry 652 is configured to calculate a CRC-X value on all bits of the N-bit intermediate data in the feedback CRC-X calculation engine 690 to compute a CRC-X feedback frame value for the data frame. The CRC-X feedback value is used in the next data cycle as an initial CRC-X value to for the CRC-X calculation to be computed over the data bits on the N-bit data input in the next cycle that belongs to the data frame. A flip-flop 656 is used to delay the CRC-X feedback value such that it can be used in the next data cycle by the frame CRC-X calculation engine 680.

The operations of each frame CRC-X calculation engine 680 is similar to those of the frame CRC-X calculation engine circuitry 500 described above with reference to FIG. 5, and hence need not be repeated here with the exception that the frame CRC-X calculation engine 680 is also configured to compute a CRC feedback value for scenarios where an entire data cycle contains only valid data for a data frame but without a start-of-frame and without an end-of-frame for that data frame. In such a scenario, the CRC-X value of this data cycle is computed in the same manner as when there is only an end-of-frame in the data cycle, but without the shift operation that aligns the end-of-frame with the LSB because there is no end-of-frame here in this data cycle. The resulting CRC-X value for this data cycle is then fed into flip-flop 676 to delay this CRC-X value to be used as a CRC-X feedback value in the next data cycle by the frame CRC-X calculation engine 680. In the next data cycle, multiplexer 636 selects the output of flip-flop 676 as the CRC-X feedback value. This is repeated until the end-of-frame for the current data frame is received.

In order for the wide-databus frame CRC-X calculation engine circuitry 600 to be able to compute CRC-X frame values for all data frames that may be in the N-bit data input for the current data cycle, a sufficient number of frame CRC-X calculation engines 680 is required. The number of frame CRC-X calculation engines 680 required depends on the databus width and on the minimum length of the data frame corresponding to the protocol of the data frame. If the data frame minimum length is L number of bits, then the wide-databus frame CRC calculation engine circuitry 600 should have K number of frame CRC calculation engines, where K is a quotient of N/L if a remainder of N/L is 0, and K is one plus the quotient of N/L if the remainder of N/L is greater than 0. For example, for Ethernet frames, the minimum data frame length over which the CRC-32 is computed over is 512 bits. For a databus width of 512 bits, only one frame CRC-X calculation engine 680 is required because the quotient of 512/512 is one and the remainder is zero. Thus, the wide-databus frame CRC-X calculation engine circuitry 600 would include one frame CRC-X calculation engine 680 and one feedback CRC-X calculation engine 690 to be able to handle in one data cycle: (1) at most one entire data frame that includes a start-of-frame and an end-of-frame and no other partial frames on the databus; or (2) at most one partial data frame that includes an end-of-frame along with at most one partial data frame that includes a start-of-frame on the databus. For a databus width of 1280 bits, three frame CRC-X calculation engines 680 are required because the quotient of 1280/512 is two and the remainder is greater than zero. Thus, the wide-databus frame CRC-X calculation engine circuitry 600 would include three frame CRC-X calculation engines 680 and one feedback CRC-X calculation engine 690 to be able to handle in one data cycle: at most two entire data frames that includes a start-of-frame and an end-of-frame, along with at most one partial frame that includes an end-of-frame and at most one partial frame that includes a start-of-frame on the databus.

In the above embodiments, the CRC-X calculation circuitry 402, 502, 602, and 652 can be a CRC-8, CRC-16, CRC-32, CRC-64, or any other particular CRC algorithm calculation circuitry. In some embodiments, the wide-databus frame CRC-X calculation engine circuitry 600 is able to compute, in parallel, the CRC-X frame values for all data frames that are received in the same data cycle in one clock cycle corresponding to a transmission line rate on the N-bit databus. For example, for a line rate of 100 Gbps to be transmitted on a databus width of 512-bits, a clock frequency of 195 MHz is required. Thus, in embodiments that employ this line rate and bus width, the wide-databus frame CRC-X calculation engine circuitry 600 computes the CRC-X calculations for all possible data frames and partial data frames within 5.13 nanoseconds corresponding to one clock cycle of a 195 MHz clock. In other embodiments, the wide-databus frame CRC-X calculation engine circuitry 600 can compute the CRC-X frame values for the data frames that include an end-of-frame in more than one clock cycle, if the latency of the system allows for the additional clock cycles. In further embodiments, the wide-databus frame CRC-X calculation engine circuitry 600 computes the CRC-X feedback value for a data frame that has only a start-of-frame in the data cycle in one clock cycle corresponding to a transmission line rate on the N-bit databus. By being able to compute the CRC-X feedback value in one clock cycle, the wide-databus frame CRC-X calculation engine circuitry 600 eliminates the need to buffer the data input of subsequent data cycles because the CRC-X feedback value is readily available when the next data cycle occurs. In other embodiments where the wide-databus frame CRC-X calculation engine circuitry 600 computes the CRC-X feedback value in more than one clock cycle, the data input can be buffered for the same amount of clock cycles it takes for the CRC-X feedback value to be calculated.

As illustrated in the above embodiments, the frame CRC-X calculation engine 680 is scalable with the increasingly wider bus widths. By scaling the number of frame CRC-X calculation engines 680, the CRC-X values of all data frames and the CRC-X feedback value of a partial frame that may appear on the databus in a data cycle can be computed in parallel in one clock cycle. As a result, buffering of the data input can be minimized to reduce memory and logic requirements. By enabling the CRC-X values of all data frames and the CRC-X feedback value of a partial frame that may appear on the databus to be computed in one clock cycle, the latency of the system can also be reduced.

Although particular embodiments have been shown and described, it will be understood that they are not intended to limit the claimed invention, and it will be obvious to those skilled in the art that various changes and modifications may be made without departing from the spirit and scope of the claimed invention. The specification and drawings are, accordingly, to be regarded in an illustrative rather than restrictive sense. The claimed invention is intended to cover alternatives, modifications, and equivalents.

What is claimed is:

1. A method for computing a X-bit cyclical redundancy check (CRC-X) frame value for a data frame transmitted over a N-bit databus, the method comprising:
   receiving a N-bit data input with an end-of-frame for the data frame at bit position M on the N-bit databus;
   performing a bitwise XOR on X most significant bits of the N-bit data input with a CRC-X feedback value to form a first N-bit intermediate data;
   shifting the first N-bit intermediate data by M bit positions to align the end-of-frame of the data frame with a least significant bit (LSB), and padding M number of zero bits to a most significant bit (MSB) of the first N-bit intermediate data to form a second N-bit intermediate data; and
   performing a CRC-X calculation on all bits of the second N-bit intermediate data to compute the X-bit CRC-X frame value for the data frame.

2. The method of claim 1, wherein the N-bit data input includes a start-of-frame for the data frame, and the CRC-X feedback value for the data frame is all zeros, the method further comprising:
   replacing all bits that are at a more significant bit position than the start-of-frame in the N-bit data input with a corresponding zero bit prior to performing the bitwise XOR.

3. The method of claim 2, wherein the CRC-X calculation has an initial value of all ones, and the method further comprises:
   inverting a first X number of most significant bits of the data frame prior to performing the bitwise XOR.

4. The method of claim 2, wherein the CRC-X frame value for the data frame is computed in one clock cycle corresponding to a transmission line rate on the N-bit databus.

5. The method of claim 1, wherein the N-bit data input includes, at a lesser significant bit position than bit position M, a start-of-frame for another data frame without an end-of-frame for the other data frame, and the method further comprises:
   replacing all bits that are at a more significant bit position than the start-of-frame for the other data frame in the N-bit data input with a corresponding zero bit to form a third N-bit intermediate data; and
   performing another CRC-X calculation on all bits of the third N-bit intermediate data to compute a CRC-X feedback value for the other data frame.

6. The method of claim 5, further comprising inverting a first X number of most significant bits of the other data frame prior to performing the CRC-X calculation on all bits of the third N-bit intermediate data.

7. The method of claim 5, wherein the CRC-X feedback value for the other data frame is computed in one clock cycle corresponding to a transmission line rate on the N-bit databus.

8. The method of claim 1, wherein X is one of 8, 16, 32, or 64.

9. The method of claim 8, wherein X is 32, and the data frame is an Ethernet frame.

10. A frame CRC calculation engine circuitry for computing a X-bit cyclical redundancy check (CRC-X) frame value for a data frame to be transmitted over a N-bit databus, the frame CRC calculation engine circuitry comprising:
    a XOR gate configured to perform a XOR operation on X most significant bits of a N-bit data input with a CRC-X feedback value to form a first N-bit intermediate data;
    a shift logic circuitry coupled to the XOR gate, the shift logic circuitry configured to shift the first N-bit intermediate data by M bit positions to align the end-of-frame of the data frame with a least significant bit (LSB), and to pad M number of zero bits to a most significant bit (MSB) of the first N-bit intermediate data to form a second N-bit intermediate data, wherein bit position M on the N-bit databus indicates an end-of-frame of the data frame; and
    a CRC-X calculation circuitry coupled to the shift logic circuitry, the CRC-X calculation circuitry configured to calculate a CRC-X value on all bits of the second N-bit intermediate data to compute the CRC-X frame value.

11. The frame CRC calculation engine circuitry of claim 10, further comprising an input selector configured to replace all bits that are at a more significant bit position than a start-of-frame of the data frame in the N-bit data input with a corresponding zero bit.

12. The frame CRC calculation engine circuitry of claim 10, further comprising an inverter configured to invert a first X number of most significant bits of the data frame in the N-bit data input if the CRC-X calculation has an initial value of all ones.

13. The frame CRC calculation engine circuitry of claim 10, wherein X is 8, 16, 32, or 64.

14. The frame CRC calculation engine circuitry of claim 10, wherein X is 32, and the data frame is an Ethernet frame.

15. A wide-databus frame CRC calculation engine circuitry for computing X-bit cyclical redundancy check (CRC-X) frame values for one or more data frames to be transmitted over a N-bit databus, the wide-databus frame CRC calculation engine circuitry comprising:
    at least one frame CRC calculation engine, each comprising:
      a XOR gate configured to perform a XOR operation on X most significant bits of a N-bit data input with a CRC-X feedback value of a first data frame to form a first N-bit intermediate data;
      a shift logic circuitry coupled to the XOR gate, the shift logic circuitry configured to shift the first N-bit intermediate data by M bit positions to align the end-of-frame of the first data frame with a least significant bit (LSB), and to pad M number of zero bits to a most significant bit (MSB) of the first N-bit intermediate data to form a second N-bit intermediate data, wherein bit position M on the N-bit databus indicates an end-of-frame of the first data frame; and
      a first CRC-X calculation circuitry coupled to the shift logic circuitry, the first CRC-X calculation circuitry configured to calculate a first CRC-X value on all bits of the second N-bit intermediate data to compute the CRC-X frame value for the first data frame; and
    a feedback CRC-X calculation engine, comprising:
      a first input selector to replace all bits that are at a more significant bit position than a start-of-frame for a second data frame on the N-bit data input with zero bits to form a third N-bit intermediate data;
      a second CRC-X calculation circuitry coupled to the input selector, the second CRC-X calculation circuitry configured to calculate a second CRC-X value on all bits of the third N-bit intermediate data to compute a feedback CRC-X frame value for the second data frame.

16. The wide-databus frame CRC calculation engine circuitry of claim 15, wherein the frame CRC calculation engine circuitry further comprises a second input selector configured to replace all bits that are at a more significant bit position than a start-of-frame of the first data frame in the N-bit data input with a corresponding zero bit.

17. The wide-databus frame CRC calculation engine circuitry of claim 15, wherein the frame CRC calculation engine circuitry further comprises a first inverter configured to invert a first X number of most significant bits of the first data frame in the N-bit data input if the CRC-X calculation has an initial value of all ones.

18. The wide-databus frame CRC calculation engine circuitry of claim 17, wherein the feedback CRC calculation engine circuitry further comprises a second inverter configured to invert a first X number of most significant bits of the second data frame in the third N-bit intermediate data if the CRC-X calculation has an initial value of all ones.

19. The wide-databus frame CRC calculation engine circuitry of claim 15, wherein X is 8, 16, 32, or 64.

20. The wide-databus frame CRC calculation engine circuitry of claim 15, wherein a data frame minimum length is L bits, and the wide-databus frame CRC calculation engine circuitry has K number of frame CRC calculation engines, wherein K is a quotient of N/L if a remainder of N/L is 0, and K is one plus the quotient of N/L if the remainder of N/L is greater than 0.

* * * * *